Dec. 20, 1966 W. R. DOTY 3,293,018
FLANGE FORMING FIXTURE AND METHOD
Filed Sept. 18, 1963 3 Sheets-Sheet 1
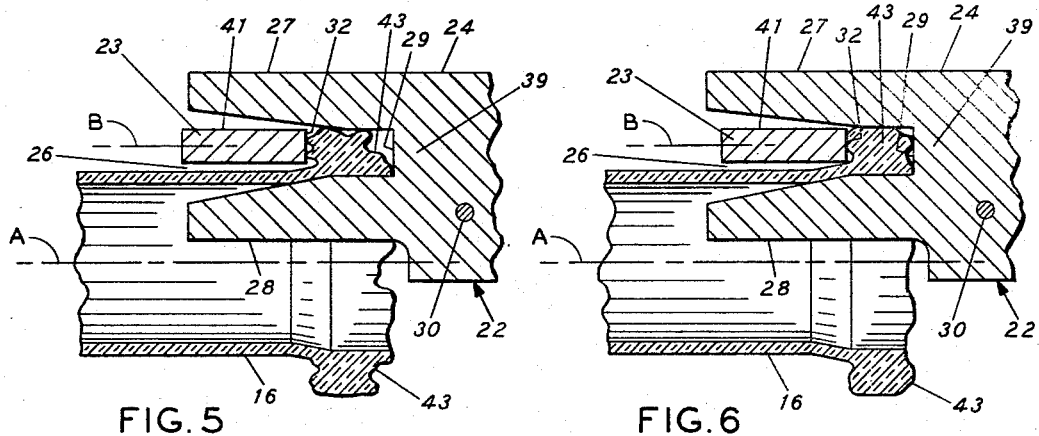
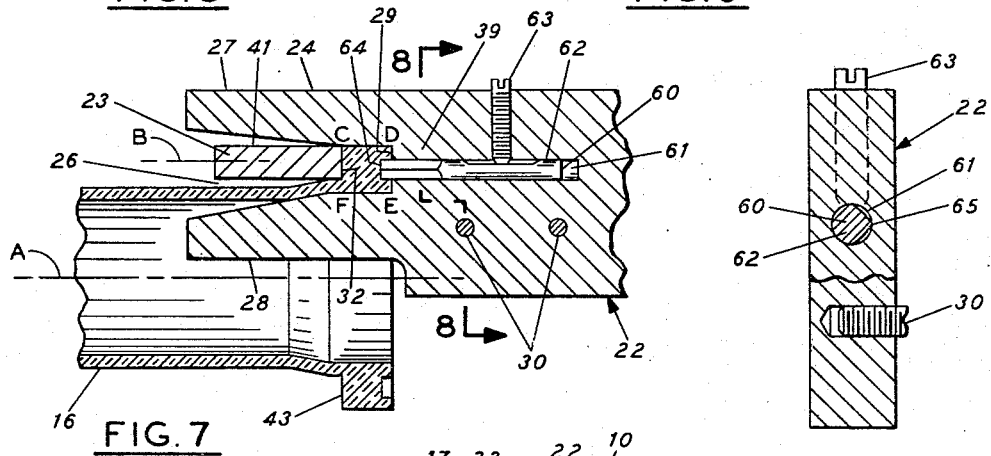
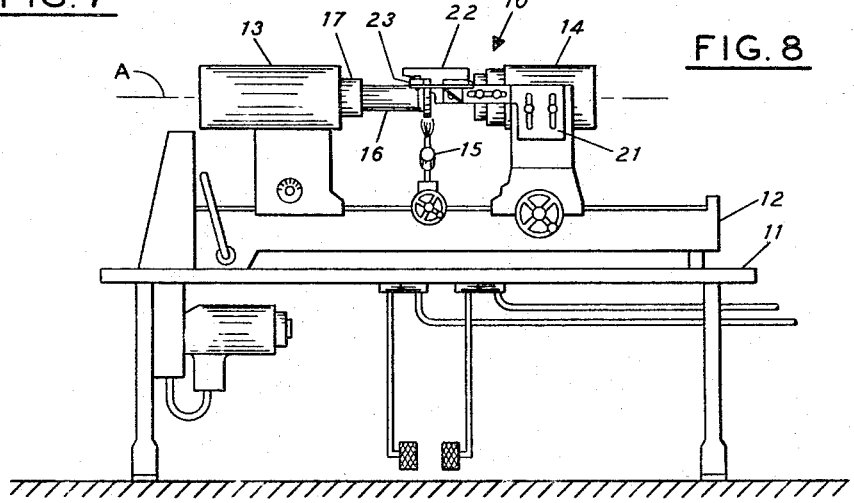
INVENTOR
WILLIAM R. DOTY
BY P.E. Johnston
George W. Wasson
ATTORNEYS

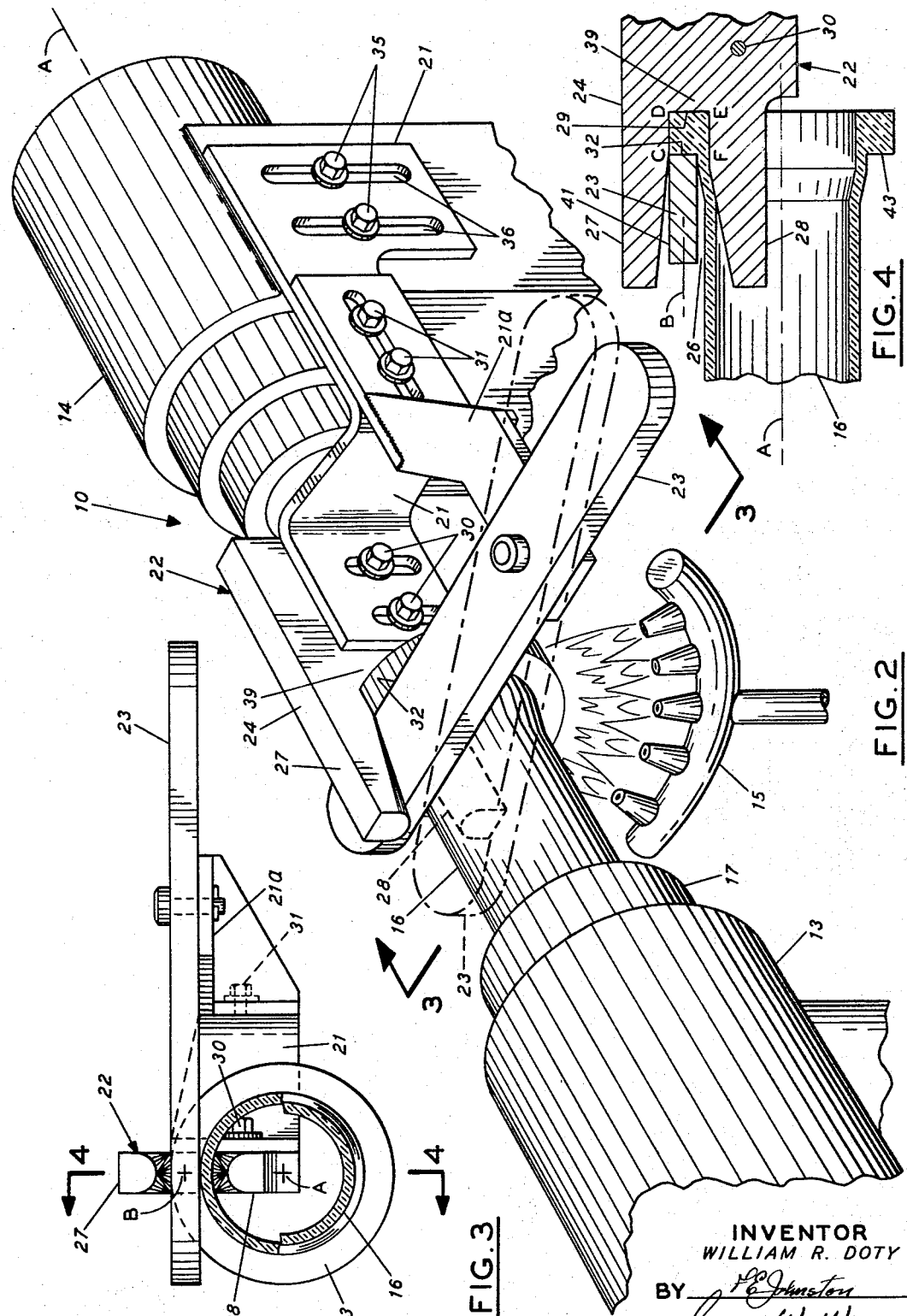

United States Patent Office 3,293,018
Patented Dec. 20, 1966

3,293,018
FLANGE FORMING FIXTURE AND METHOD
William Russell Doty, Oakland, Calif., assignor to Chevron Research Company, a corporation of Delaware
Filed Sept. 18, 1963, Ser. No. 309,668
16 Claims. (Cl. 65—109)

This invention relates to the manufacture of scientific glassware for chemical laboratories, and more particularly, to a method and apparatus for forming enlarged flanges at the ends of tubular glassware. The glass flanges formed by the method and apparatus of the present invention provide quick release joints for glassware members used as transfer piping or the like. In one aspect of the invention, pairs of flanges are formed in glassware members for abutting surface engagement normal to the axes of the glassware. In another aspect of the invention, the flanges include grooves at their end faces for capture of a deformable O ring.

The object of the present invention is the provision of an improved forming fixture for preventing the generation of haphazardly controlled forming pressures in the manufacture of glassware for chemical laboratories. The above-mentioned forming pressure is exerted to shape the end portion—termed the annulus—of a tubular glassware member into a flange having a plain or grooved face. In accordance with the invention, a controlled forming pressure is established by an improved forming fixture constructed of a female means having a U-shaped end portion operatively positioned about three sides of the annulus of a rotating glassware member, and a male means positioned in working contact with the fourth side of the annulus. When the annulus has assumed the accurately oriented contour of a two-dimensional mold defined by the male and female means, substantially independent of operator skill, the pressure exerted by the fixture is interrupted. Thereafter the completed glassware member is removed from the fixture.

It has been the practice of the prior art to provide flanges at the edges of rotating glassware members by a method that includes the steps of heating an end portion of the glassware member to a plastic state, gathering the plastic glass into the desired thickness, and flaring the heated section into a flange having either (a) a plain face or (b) a grooved face. In gathering and initially flaring the heated section, a flange forming paddle having a flat surface at the edge of a longitudinal body and a handle attached to the body for controlling the paddle, is positioned in contact with the glassware member. Gradual changes in the contact angle and pressure (applied by the flat forming surface of the paddle) shape the plastic glass into a flange of the approximate desired geometry. In forming grooves at the surface of a flange, a second forming tool is used—called forming pliers—comprising two elongated members hinged together to form jaws. As the jaws are brought together to grip opposed surfaces of the flange at a location remote from the axis of rotation of the glassware member, a boss positioned on the face of one of the members penetrates the surface of the flange. Among the disadvantages of the above-described flange forming method are high production costs, low output and an inherent inability to provide flanges having faces of prescribed geometrical specification, i.e., within a range of dimensions that provides acceptable joints regardless of assembly order (good interchangeability). The last-mentioned limitation will become more apparent after consideration of the fact that the glass operator who carries out the method, controls the flange forming paddle without rigid external guides, fixtures and the like.

The present invention contemplates a method and apparatus for forming a precisely oriented flange at the edge of a rotating glassware member in which haphazard application of forming pressure on the glassware member is prevented. In accordance with the invention, a controlled forming pressure is established by a forming fixture having complementary male and female elements adjustably attached by means of a mounting bracket to a conventional glass-working lathe. The female element includes a U-shaped end portion defining a recess having first and second parallel side surfaces terminated by an end surface normal to the axis of rotation of the glassware member. The end and side surfaces defining the recess are operatively positioned about the edge of the rotating glass member so that, as the male element is positioned within the recess thereby placing the plastic glass under stress, the glass is able to assume the contour of the recess substantially independent of operator skill. In a modification of the fixture, a boss is attached to the end wall of the recess of the female element to provide for the formation of a groove at the transverse face of the flange. In another modification of the fixture, the inside leg of the U-shaped female element diverges inwardly with respect to the axis of rotation of the glassware member to enlarge the diameter of the glassware member prior to gathering and shaping the glass. This allows glass stock of slightly varying diameters to be used to form flanges of constant average diameters.

In accordance with a preferred method for carrying out the invention, a glass-working lathe is conveniently used to rotate a tubular glassware member, support a burner or a high frequency induction heater adjacent an edge of the glassware member, and provide rectilinear movement for the forming fixture relative to the glassware member. During rectilinear movement, pressure is exerted on the heated edge of the glassware member by the side and end surfaces of the U-shaped recess of the female element to shape the edge into an annulus of irregular cross section. After movement of the female element is terminated, pressure on the annulus is intensified by pivoting or moving the male element into cooperative contact on the fourth side of the annulus at a location within the recess but remote from the end surface thereof. After the annulus has assumed the contour of a two-dimensional mold formed by the sides of the recess and the adjacent edge of the male element substantially independent of operator skill, pressure exerted by the fixture is terminated by pivoting or moving the male element away from the glassware member. Thereafter, the glassware member is removed from contact with the female element.

The present invention will become more apparent from the following detailed description of the invention taken in conjunction with the following drawings in which:

FIGURE 1 is a side elevation view of a flange forming machine comprising a glass working lathe and a forming fixture constructed in accordance with the invention;

FIGURE 2 is an isometric projection of a portion of the flange forming machine of FIGURE 1 illustrating the forming fixture mounted to the tailstock of the lathe;

FIGURE 3 is a longitudinal section taken along plane 3—3 of FIGURE 2 illustrating the spatial relationship of the elements comprising the forming fixture;

FIGURE 4 is a transverse sectional view taken along line 4—4 of FIGURE 3 illustrating further details of the element comprising the fixture;

FIGURES 5–6 are sectional details similar, in part, to FIGURE 4 illustrating the operation of the forming fixture;

FIGURE 7 is a sectional detail illustrating a modified element of the forming fixture;

FIGURE 8 is a transverse section of the modified element taken along line 8—8 of FIGURE 7.

Figure 9:
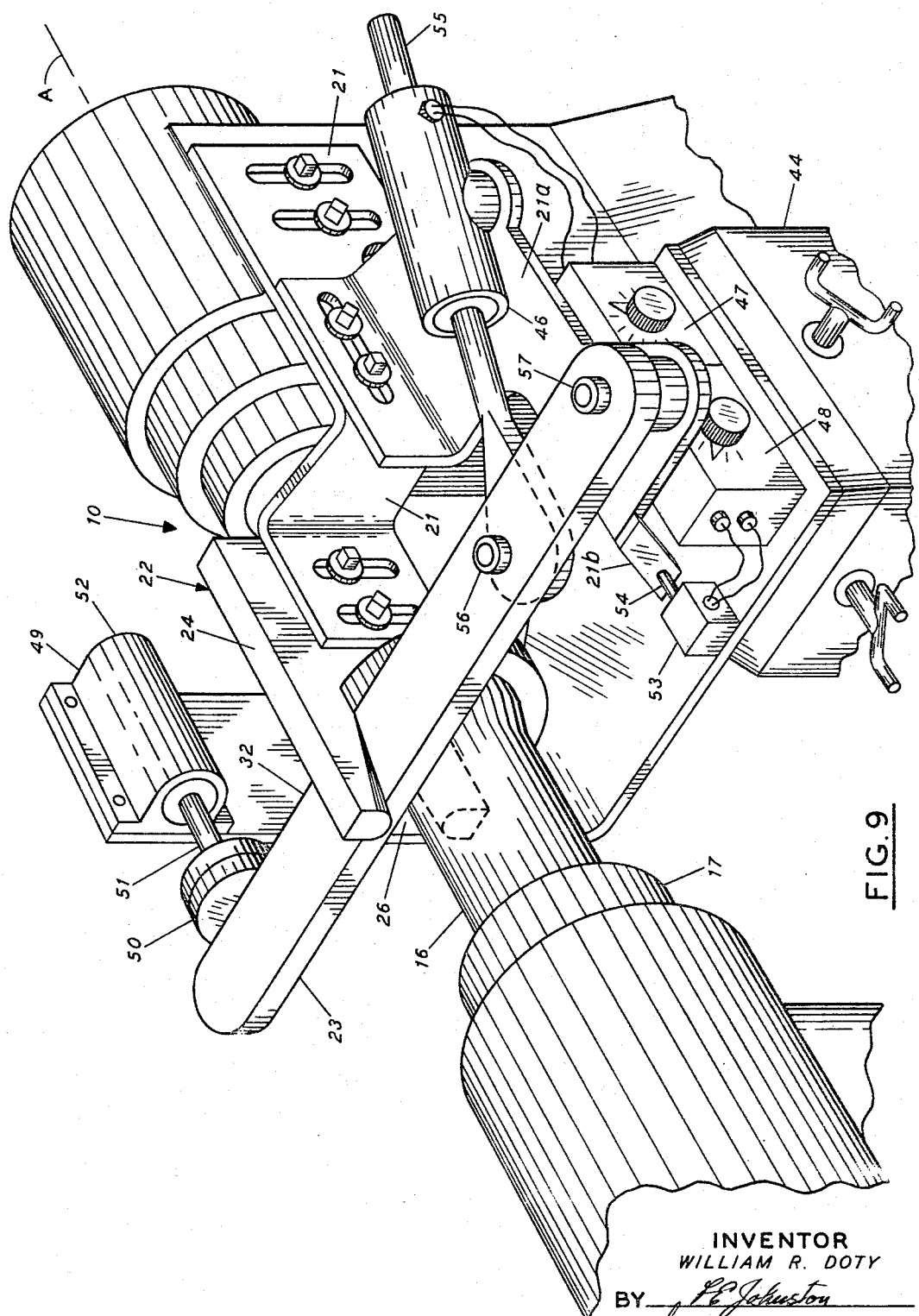
FIGURE 9 is an isometric projection of a modified flange forming machine illustrating an automated fixture mounted to a glass lathe.

Referring to the drawings, particularly to FIGURE 1, a flange forming fixture 10 is illustrated as preferably mounted on a lathe having a base 11 supporting bed 12. Bed 12 supports the lathe headstock 13 at one end thereof, tailstock 14 at the other end, and a multijet burner 15 at an intermediate position. A piece of tubular glass 16 is releasably secured to headstock 13 through a lathe chuck 17. The forming fixture 10 comprising the invention is attached to the housing of the tailstock 14 and includes a mounting bracket 21, a female element 22 and male element 23.

The detailed operation of the forming fixture 10 and the way that a flange is formed at the edge of tube 16 are best seen in FIGURES 2–4. In the position shown in FIGURE 2, mounting bracket 21 and associated female element 22 and male element 23 are connected to the tailstock 14 so that axis B of the female element is parallel and above axis A of the lathe. To achieve parallelism, the bracket 21 is attached to the tailstock by a plurality of bolts 35 that extend through slots 36 in the bracket. To provide for horizontal adjustment of the fixture, shims (not shown) may be positioned at bolts 30 and 31 that connect the female element and extension bracket 21a respectively, to bracket 21.

Glass tube 16 is secured to chuck 17 preferably so that its axis is collinear with axis A of the lathe and is provided with rotational movement. The speed of such rotation may be adjusted so that centrifugal force does not flare the plastic glass to a marked degree.

Burner 15 for burning a suitable gaseous mixture is positioned below the rotating glass tube and adjusted to provide the heat necessary to make the glass formable over a predetermined longitudinal section. The length of the section to be heated depends on the dimensions specified of the finished flange varying in accordance with $$t(D_4^2-D_3^2)/(D_2^2-D_1^2)$$

where: $t$ is the length of the flange parallel with the axis B, $D_1$ is the inside diameter of the glass member, $D_2$ is the outside diameter of the glass member, $D_3$ is the inside diameter of the formed flange, and $D_4$ is the outside diameter of the formed flange. As the tube section reaches a plastic or formable state, the tailstock is moved to the left as viewed in FIGURE 1 to bring the U-shaped end portion 24 of the female element 22 into contact with the leading edge of the tube. As will be explained more fully below, contact between the glass and the female element occurs initially along the interior surface of leg 28 of the recess 26. As movement of the tailstock continues toward the left however, the glass is forced to contact end surface 29 of bight 39 normal to the axis B of the female element. Pressure exerted at end surface 29 is normal to the direction of travel and gradually the edge of the glass is folded back over the member (becomes beaded) to form an irregularly segmented annulus 43 at the exterior periphery of the tube, see FIGURE 5. When the predetermined longitudinal section defined by the above formula has been shaped, movement of the tailstock is terminated.

To assure against breakage during the annulus shaping operation, it should be noted that the interior surface of legs 27 and 28 and bight 39 are preferably bevelled at their midpoint in a plane intercepting axis B of the female element. Thus the glass may be transformed gradually from an annulus to the beaded shape shown. Also male element 23 is not within the recess of the female element during formation of the annulus 43, but is positioned exterior thereof as indicated in phantom line in FIGURE 2.

In the arrangement of FIGURE 2, the glassware may include an outwardly angled or divergent portion adjacent to annulus 43. This can be achieved by providing the interior surface of leg 28 of the female element with an oppositely angled terminating surface as shown in FIGURE 4 so that, as the tailstock moves toward the leading edge of the tube, the angled surface of leg 28 exerts outward pressure on the glass. Thus, regardless of the initial diameters of the tubes, completed annuli 43 have identical inside diameters. Furthermore, since these diameters remain constant during subsequent fabrication steps as explained below, joints provided by flanges in accordance with the invention have smooth interior faces regardless of the original size of the glassware members used to form the joints.

For shaping annulus 43 into a flange having desired geometry, male element 23 is positioned within recess 26 of the female element in rubbing contact with annulus 43. As illustrated in FIGURE 5, frontal edge 32 of the male element initially contacts the plasticized annulus only over a portion of its width, but as pivotal movement continues, see FIGURE 6, the edge encounters increasing segments of the rotating annulus.

As the annulus is shaped, the male element is free to slip into the recess 26 of the female element along a path parallel with axis B since guiding contact between the male and female elements is maintained at the inner face of the interior surface of leg 27 of the female element and upper surface 41 of the male element. After contact with the annulus is achieved, the rate of movement of the male element is controlled so that the fixed sections of glass have time to reach the temperature of the thinner sections before being displaced to the right as viewed in FIGURE 4. Since the fixture physically covers only a portion of the rotating annulus, e.g., approximately 30 degrees, as shown in FIGURE 3, the annulus may accept heat during movement of the male element without affecting the operation of the fixture.

When the product of the dimensons defining rectangular mold C–D–E–F, see FIGURE 4, is equal to $t$ $(D_4-D_3)$ where $t$ is the length of the flange parallel with axis B, $D_3$ is the inside diameter of the formed flange and $D_4$ is the outside diameter of the formed flange, movement of the male element is terminated. This condition is observed by noting an increase in resistance to pivotal movement of the male element. After the burner is removed to a location remote from the edge of the tube, the flange solidifies to the dimensions of the mold. Thereafter the male and female elements are removed from contact with the finished flanges by providing pivotal movement to the male element and rectilinear movement to the female element.

Use of rectangular mold C–D–E–F is essential to carrying out the invention. In addition to providing a contrasting, two-dimensional reference plane to help the operator observe when the annulus has been transformed into a flange, i.e., when the annulus has filled the mold, the mold balances the pressure about intercepting planes of the glass and mold. The last-mentioned advantage is achieved by means of the bevelled interior surfaces of legs 27 and 28 and bight 39, as shown in FIGURE 3, that gently guide the annulus into contact with the mold. Otherwise, rubbing contact with the glass may be so abrupt and concentrated as to cause breakage of the annulus.

In FIGURE 4 the end surface 29 of bight 39 is shown positioned in contact with the end surface of the flange—termed the face of the flange. Thus it may be observed that the dimensions of the end surface 29 of the mold exclusively define the geometry of the flange face. Since these dimensions are constant in magnitude and orientation, the face provided thereby tends to be flatter and more concentric than flanges of the prior art. By way of example, a forming mold in accordance with the invention having a bight dimension of ½ inch has provided a flange face having a flatness within .004 inch T.I.R. (True Indicator Reading).

In FIGURES 2 and 4 the frontal edge 32 of the male element is illustrated in a position substantially parallel with the end surface 29 of the recess 26 but it is understood that during formation a slight entrance angle is necessary to guide the tube of the glass into initial contact with the male element. To achieve the entrance angle for differing thicknesses of flanges, it may be necessary to adjust the location of the male element relative to axis A as by loosening bolts 31 attached to mounting bracket 21. The extent of such movement can be ascertained by measuring the lateral distance separating the frontal edge 32 of the male element from the end surface 29 of the recess when the former is in position within the recess.

In FIGURES 7 and 8 there is shown a modification of the female element to provide a groove in the annulus as the flange is formed. In the illustrated modification specifically the female element 22 includes a U-shaped end portion 24, a pin member 60 forming a boss, and a recess 26 having side surfaces defined by legs 27 and 28 and an end surface 29 defined by bight 39. The pin member 60 is slidably attached within keyway 61 and includes a main body portion 62 secured in position by a set screw 63 and a head portion 64 exterior of the keyway forming the boss. The head portion 64 (boss) has a portion of the outer surface bevelled terminating in an apex 65, see FIGURE 8, and is positioned to penetrate the plasticized glass as the flange is being formed. In order to reduce stress on the annulus during formation of the groove, the apex 65 is positioned normal to the direction of rotation of the annulus. Penetration between the exposed head comprising the apex and the plasticized glass is minimum during the step of forming annulus 43 owing to the fact that the glass is free to move away from the pin (toward the headstock of the lathe). However, after the male element 23 is positioned within the recess 26, pressure exerted by the mold C–D–E–F allows maximum penetration within the annulus.

In FIGURE 9 there is shown another modification of the invention that provides automatic formation of flanges without immediate supervision of a glass technician. As illustrated, forming fixture 10 attached to the tailstock of the lathe, has a mounting bracket 21, a female element 22 and a male element 23 similar to those previously described except for modifications to be noted. More particularly the female element attached to the tailstock includes a U-shaped end portion 24 and a recess 26. The male element 23 is pivotally attached to the extension bracket 21a and is connected to a solenoid means 46. On x–y positioner 44 adjacent the forming fixture, are suitable timing mechanisms 47, a power source such as battery 48 and switch 53 electrically connected to solenoid 46, and a velocity dampener 49. The dampener comprises a cushion 50 and a shaft 51 supported within a pressurized housing 52.

In operative sequence, after the glass tube 16 is releasably secured to chuck 17 and the edge thereof is heated to a plastic state, the female element is provided with rectilinear movement toward the headstock of the lathe to bring it into contact with the edge of the tube. After an annulus of irregular cross section has been formed, the solenoid 46 is electrically connected with battery 48 as the operator shaft 54 of switch 53 contacts extension member 21b. Plunger 55 of the solenoid provides movement to the male element through a socket connection 56. As the plunger moves through the solenoid housing, the male element pivots about pivot bolt 57, toward the female element. Prior to contacting the annulus of the tube 16, the male element contacts cushion 50 of dampener 49 for the purpose of reducing its impact velocity; movement of the dampener shaft 51 (and hence the male element) to the right is inhibited by air pressure within dampener housing 52. After the pivot velocity of the male element has been reduced to a predetermined level, the male element gently contacts the plasticized glass along a portion of its edge 32. As pivotal movement continues, the edge 32 of the male element encounters increasing amounts (area-wise) of the annulus and pushes it towards the end wall 29 of the recess as shown in FIGURE 4. When the annulus completely fills the rectangular mold, movement of the male element is terminated. This may be done manually or by automatic means as by proper adjustment of the terminal air pressure within the dampener housing 52. Solenoid 46 is then disconnected from battery 48 by the actuation of timing switch 47. Plunger 55 of the solenoid retracts the male element from contact with the formed flange and returns it to a position adjacent to the rotating tubulation. After the female element has also been disconnected from the flange and rotational movement of the lathe is terminated, the glass tube is removed from the headstock.

While certain preferred embodiments of the invention have been specifically disclosed, it should be understood that the invention is not limited thereto as many variations will become apparent to those skilled in the art. The invention therefore is to be given its broadest possible interpretation in terms of the following claims.

What is claimed is:

1. A tool for forming a precision flange at the edge of a rotating tubular glassware member, said edge having been heated to a plastic state, said tool comprising in combination, mounting means releasably secured relative to said glassware member, female means releasably attached to said mounting means and having a U-shaped end portion remote from said mounting means, said U-shaped end portion defining a recess having first and second side surfaces, an end surface, and a longitudinal axis parallel with the axis of rotation of said glassware member, and male means movable into and releasable from the recess of said female means and releasably attached to said mounting bracket at a location remote from said female means.

2. A tool in accordance with claim 1 in which said male means is pivotally supported on said mounting means and has a plane of pivotal movement intercepting the longitudinal axis of said recess.

3. A tool in accordance with claim 1 in which said first side surface of said recess of said female means is located adjacent to and parallel with the rotational axis of said glassware member and terminates in a divergent portion remote from the end surface of said recess.

4. A tool in accordance with claim 1 in which said second side surface of said recess of said female means is remotely positioned with respect to the rotational axis of the glassware member and in a plane defined by the longitudinal axis of said recess and the rotational axis of said glassware member.

5. A tool in accordance with claim 1 in which the side surfaces and the end surface of the recess of said female means are bevelled to define longitudinally extending apexes coplanar with each other and the axis of rotation of the glassware member.

6. The tool in accordance with claim 1 in which the bight portion of said U-shaped end portion of the female means includes a keyway collinear with said axis of said recess, and a pin means positioned in said keyway having a head portion penetrating said bight portion.

7. The tool in accordance with claim 6 in which the surface of the head portion of the pin means penetrating said bight portion is bevelled and terminates in a longitudinally extending apex parallel with the axis of the recess.

8. A tool for providing a precision flange at the end edge of a rotating glassware member in which said edge has been heated to a plasticized state, said tool comprising in combination, mounting means releasably secured relative to said glassware member, female means releasably attached to said mounting means and having a U-shaped end portion remote from said mounting means, said U-shaped end portion defining a recess having a longitudinal axis parallel with the rotational axis of said glassware member, first and second interior side surfaces, and an interior end surface normal thereto, means for providing relative translatory movement between said female means and said glassware member whereby the plasticized edge of said member is positioned in contact with the surfaces of the recess and is reshaped into an annulus of irregular cross section, male means movable into and releasable from the recess of said female means and pivotally attached to said mounting means at a location remote from said female means, and means for pivoting said male means relative to said female means for placement within said recess in rubbing contact with said annulus to shape said annulus into said precision flange.

9. The tool of claim 8 in which said male means includes an elongated member having a forming edge normal to the side surfaces when positioned in rubbing contact with said annulus, said member being guided in travel toward the end surface of said recess by the side surface of said recess remote from the rotational axis of said glassware member.

10. The tool in accordance with claim 8 in which the means for pivoting the male means relative to said female means includes
a solenoid means,
a battery means for providing energy to said solenoid means,
a switch means for operatively connecting and disconnecting said battery and said solenoid, and
a dampener means,
said solenoid means having a base pivotally attached to said mounting means and a plunger attached to said male means for providing said male means with pivotal movement,
said dampener means having a base releasably secured relative to the said male means for reducing the pivotal movement of said male means at a location exterior of the recess of said female means.

11. The tool in accordance with claim 10 in which the switch means for operatively connecting the solenoid means and the battery means includes a timing means for disconnecting said battery means from said solenoid means after a predetermined time duration.

12. The method of shaping a glassware member to form a flange at an end edge thereof wherein said member is provided with rotational movement relative to its longitudinal axis and said end edge is heated to a plastic state over a longitudinal section thereof, comprising the steps of
gathering said longitudinal section into an annulus of irregular cross section wherein the inside diameter of said annulus is at least equal to the inside diameter of said member,
positioning said annulus in a recess defined by side surfaces and a connecting end surface, said side surfaces being parallel to the rotational axis of said member and said end surface being normal to said side surface,
applying pressure to said annulus on a side remote from the end surface of said recess to direct said annulus against non-contacting portions of the side surfaces and end surface,
terminating said pressure when said annulus fills said recess,
and thereafter removing said glassware member from said recess.

13. The method of claim 12 with the additional step of enlarging the diameter of said longitudinal section of said glassware member prior to forming the said annulus by
positioning an interior edge of said section in said recess in contact with an angled portion of a side surface thereof, and
thereafter providing relative movement between said recess and said section to enlarge said glassware member.

14. In the method of shaping a tubular glassware member to form a flange at one end thereof wherein said member is provided with rotational movement relative to the longitudinal axis of said member and is heated to a plastic state over a longitudinal section thereof, the improvement comprising the steps of
positioning a segment of said heated section of said glassware member within a recess of a U-shaped forming means releasably secured relative to said member,
providing relative longitudinal movement between said member and said recess wherein a side surface and end surface of said recess engage said section,
continuing said movement whereby said side and end surfaces engage successive segments of said heated section to shape said section into an annulus of irregular cross section having an inside diameter at least equal to the inside diameter of said member,
interrupting said relative longitudinal movement between said recess and said member,
applying pressure to said annulus along a path parallel with said longitudinal axis toward said end surface by means of an elongated means having a forming edge normal to the side surfaces of said recess, said pressure being of sufficient magnitude to provide said annulus with movement relative to said glassware member,
terminating said pressure when said annulus fills the forming mold defined by the side and end surfaces of said recess and said forming edge of said elongated means,
and thereafter moving said glassware member from said mold.

15. The method of shaping a rotating tubular glassware member to form a flange at an end edge thereof having a groove located between the periphery and the interior of the flange and at an end edge thereof, comprising the steps of
heating a longitudinal section of said member to a plastic state,
gathering said longitudinal section into an annulus of irregular cross section wherein the inside diameter of said annulus is at least equal to the inside diameter of said member,
positioning the annulus in a recess defined by side surfaces parallel with the rotational axis of said member and an end surface normal thereto having a boss thereon penetrating said recess, a sector of the inside periphery of the rotating annulus contacting the side surface of the recess nearest the rotational axis of said member,
applying pressure to said annulus on a side remote from said recess to direct the annulus against said side surfaces, end surface, and said boss penetrating said recess,
terminating said pressure when the annulus completely fills the recess, and
thereafter removing said glassware member from said recess.

16. The method of claim 15 with the additional step of enlarging the diameter of said longitudinal section of said glassware member prior to forming the said annulus by
  positioning an interior edge of said section in said recess in contact with an angled portion of a side surface thereof, and
  thereafter providing relative movement between said recess and said section to enlarge said glassware member.

References Cited by the Examiner
UNITED STATES PATENTS 1,436,825  11/1922  Sanford _____ 65—296
3,169,847  2/1965  Condon _____ 65—282

DONALL H. SYLVESTER, *Primary Examiner.*

A. D. KELLOGG, *Assistant Examiner.*